April 28, 1925. 1,535,103

W. P. COLE

SHOCK ABSORBER

Filed July 20, 1922 2 Sheets-Sheet 1

Inventor

William P. Cole

April 28, 1925. 1,535,103
W. P. COLE
SHOCK ABSORBER
Filed July 20, 1922 2 Sheets-Sheet 2

Inventor
William P. Cole

Patented Apr. 28, 1925.

1,535,103

UNITED STATES PATENT OFFICE.

WILLIAM P. COLE, OF COALINGA, CALIFORNIA.

SHOCK ABSORBER.

Application filed July 20, 1922. Serial No. 576,304.

*To all whom it may concern:*

Be it known that I, WILLIAM P. COLE, a citizen of the United States, residing at Coalinga, in the county of Fresno and State of California, have invented certain new and useful Improvements in Shock Absorbers, of which the following is a specification.

This invention relates to shock absorbers particularly adapted for use on the well known Ford automobile, and also capable of being used on the Chevrolet automobile with a slight modification.

The prime object of their invention is to provide means for not only receiving the shock of the vehicle body on downward movement of same, but to also absorb the rebound of the vehicle body or upward movement.

Heretofore many devices have been designed for use on the Ford automobile, but none of these patented devices have proved capable of accomplishing the results set forth above.

A further object of my invention is to provide a combined shock and rebound absorber, which is simple in construction and operation, efficient for the purpose intended, and one that can be manufactured and placed on the market at a relatively low cost.

These and like objects of the invention will be better understood as the description follows and as is specifically pointed out in the appended claims.

Referring to the accompanying drawings which form a part of this specification and which clearly illustrates the operation and construction of my improved shock absorber, Figure 1 is a fragmentary side elevation of the front axle of a Ford automobile, showing my improved shock absorber attached thereto.

Figure 1:
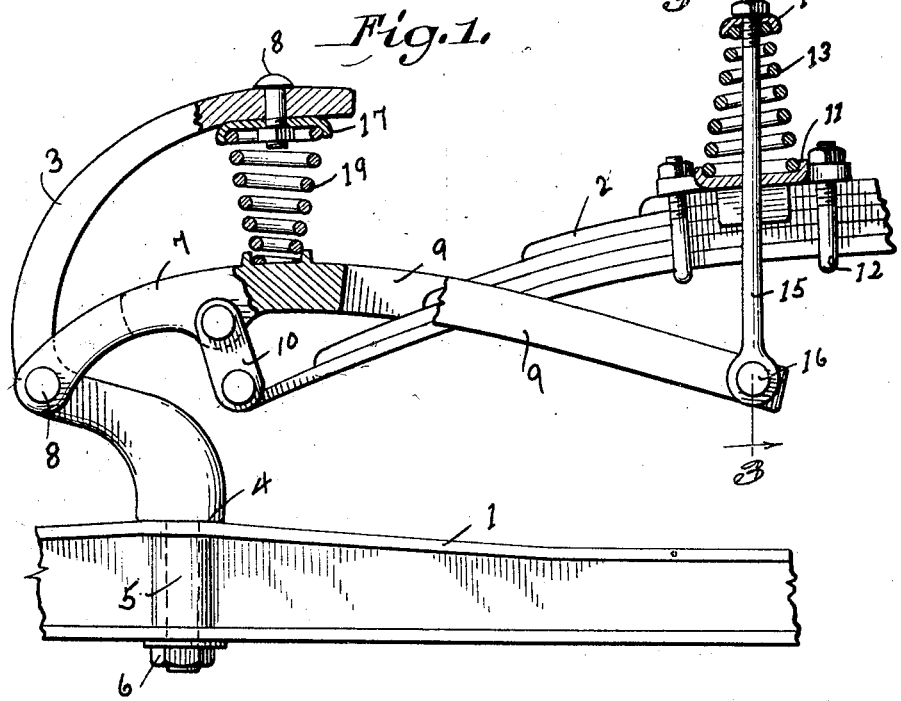

Referring to the drawings in detail, the numeral 1 indicates the front axle of a Ford automobile, and the numeral 2 designates the compound leaf spring to which the body of the vehicle is attached intermediate the ends of the compound spring.

Heretofore, the ends of the compound leaf spring 2 have been connected directly to the axle 1, and while this arrangement has to a certain extent absorbed the shock on the downward movement of the vehicle body, it has in no way been designed to absorb the shock or rebound of the vehicle body. In order to accomplish both of these results, I have provided a hanger 3 formed with a shoulder 4 for engagement with the upper surface of the axle 1 and a reduced portion 5, which is intended to pass through the axle 1 and be secured therein by means of the fastening nut 6. A shock lever 7 is pivotally connected to the hanger 3 as at 8 and the opposite end of the shock lever 7 is bifurcated to provide arms 9, between which the ends of the compound leaf spring 2 pass and which are in turn coupled to the shock lever by means of coupling links 10.

In order to receive the shock on downward movement of the vehicle body, a plate 11 is positioned on top of the compound spring 2 and is fastened in position by means of U-bolts 12. Positioned on opposite ends of the plate 11 are shock absorbing springs 13. The upper end of each of the springs 13 bear against the cup-shaped plate 14 which is held in engagement with the springs by means of bolts 15, which pass through the plate 14, springs 13, and the bottom plate 11. The extreme ends of the arms 9 of the shock lever 7 and the bolts 15 are connected by means of a cross bolt 16, thus it will be seen that on downward movement of the vehicle body and the compound spring 2, that tension will be placed on the springs 13, thus receiving the shock on the downward movement of the vehicle body.

In order to provide for the rebound of the vehicle body, a plate 17 is attached to the underface of the hanger 3 by means of the bolts 18 and a coil spring 19 is positioned between the plate 17 and the upper surface of the shock lever 7, so that on upward movement of the vehicle body as on rebound of same, the spring 19 will receive the shock of same.

Figure 2:
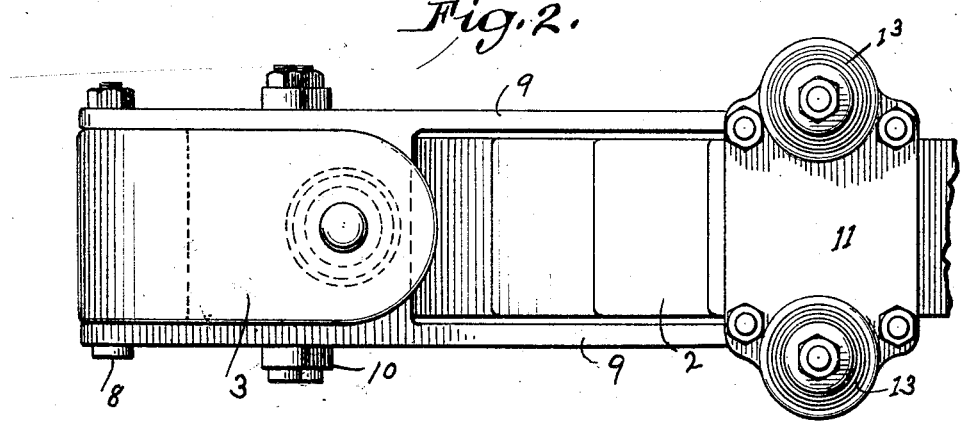
Figure 2 is a fragmentary plan view of same.
Figure 3:
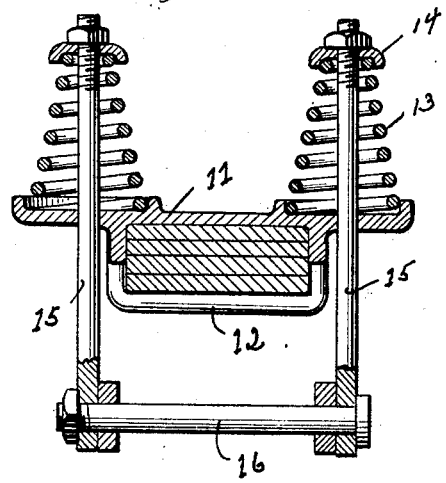
Figure 3 is a vertical section taken on line 3—3 of Figure 1.
Figure 4:
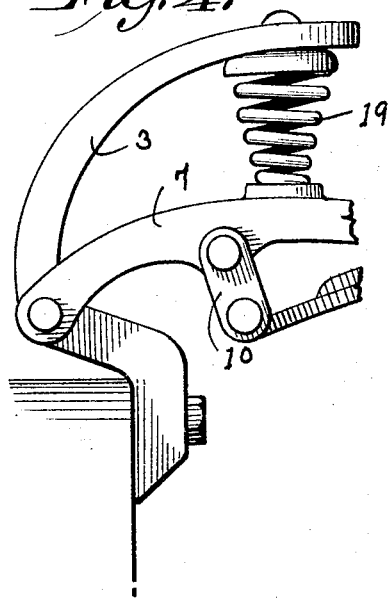
Figure 4 is a fragmentary enlarged side elevation of a modified form of securing the shock absorber to the frame of the motor vehicle.

In Figure 4, I have shown a slightly modified form, wherein the hanger 3, instead of being secured to the axle 1 is made fast to the frame or rear hub plate of the car 2, otherwise, the construction of the shock absorber is the same as described in Figures 1 and 2.

Figure 5:
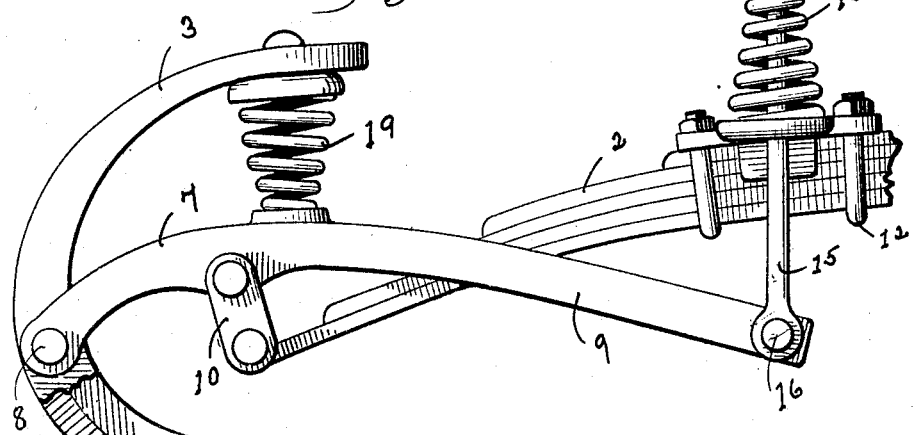
Figure 5 is an enlarged side elevation, partly in section showing a modified form of my invention for use on the well known Chevrolet automobile.
Figure 6:
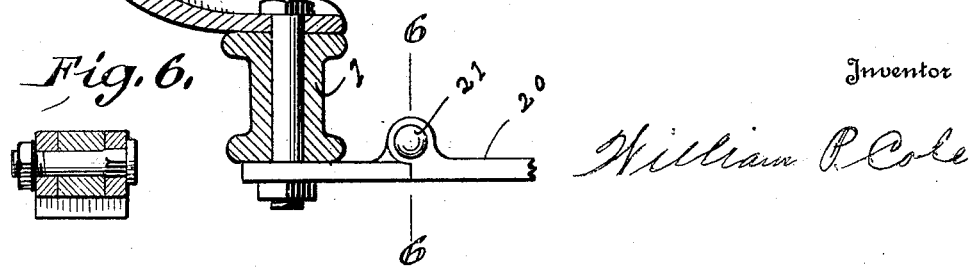
Figure 6 is a sectional view taken on line 6—6 of Figure 5.

In Figure 5, I have shown a further modified form, and particularly adapted for use on the Chevrolet automobile. In this instance, instead of having the spring 2 run parallel with the axle 1, same is at right angles to the latter, and while one end of the leaf spring is supported by the axle to means already described, the opposite end of the leaf spring is attached to the body of the motor vehicle. A brace rod 20 having a hinged joint 21 is secured at its opposite ends to the front and rear axle of the motor vehicle.

In view of the foregoing description of my invention taken in connection with the accompanying drawings, it is thought that any further explanation as to the construction, operation, and objects of same are unnecessary.

While I have shown and described the preferred form of my invention, I realize that various minor changes may be resorted to, without departing from the spirit and scope of the appended claims, and therefore, I do not wish to limit myself to the exact details of construction shown, nor to the combination and arrangement of parts.

What I claim as new and desire to secure by Letters Patent is:

1. In a shock absorber, the combination with an axle of a vehicle, a leaf spring, a hanger carried by the axle and having a portion overhanging the leaf spring, a shock lever having one end pivotally connected to the hanger, compression springs mounted upon the leaf spring, means connecting said compression spring with the other end of the shock lever to absorb downward movement of the vehicle, said leaf spring having connection with the shock lever between its ends, and a second compression spring arranged between the shock lever and the free end of the hanger for absorbing upward movement of the vehicle.

2. In a shock absorber for motor vehicles, the combination with a vehicle axle, a leaf spring, a hanger having its free end overhanging a portion of the leaf spring, a shock lever having one end pivotally connected to the hanger, the other end of the shock lever being provided with a pair of arms to straddle the leaf spring, a plate mounted upon the leaf spring, a pair of compression springs supported upon said plate, a pair of rods having their lower ends pivotally connected to the arms of the shock lever and their upper ends extended through the convolutions of the compression springs, plates carried by the upper ends of said rods and resting upon the compression springs, said leaf spring being pivotally connected to the shock lever between its ends, and a compression spring having one end abutting the shock lever between its ends and the other end of the compression spring bearing against the overhanging end of the hanger.

3. In a shock absorber in combination with the axle of a motor vehicle, a leaf spring, a hanger, a shock lever pivotally connected to said hanger, means for connecting said leaf spring to said shock lever, spring means connecting said shock lever and leaf spring for receiving the jar on downward movement of a vehicle body, and spring means positioned between the hanger and shock lever for receiving the rebound on upward movement of a vehicle body.

In testimony whereof, I have affixed my signature in the presence of two witnesses.

WILLIAM P. COLE.

Witnesses:
T. C. HARSHBARGER,
W. H. ARNEY.